(12) United States Patent
Brunbauer

(10) Patent No.: US 8,241,026 B2
(45) Date of Patent: Aug. 14, 2012

(54) POLYMER PROCESSING MACHINE AND METHOD FOR THE OPERATION OF A POLYMER PROCESSING MACHINE

(75) Inventor: Klaus Brunbauer, Bad Voeslau (AT)

(73) Assignee: Wittmann Battenfeld GmbH, Kottingbrunn (AT)

( * ) Notice: Subject to any disclaimer, the term of this patent is extended or adjusted under 35 U.S.C. 154(b) by 183 days.

(21) Appl. No.: 12/835,076

(22) Filed: Jul. 13, 2010

(65) Prior Publication Data

US 2011/0012278 A1    Jan. 20, 2011

(30) Foreign Application Priority Data

Jul. 14, 2009   (DE) .................. 10 2009 033 228

(51) Int. Cl.
*B29C 45/76* (2006.01)
*B29C 45/78* (2006.01)
(52) U.S. Cl. .................. 425/144; 425/162; 425/167
(58) Field of Classification Search .............. 264/40.1, 264/40.5, 40.6, 40.7; 425/162, 167, 143, 425/144
See application file for complete search history.

(56) References Cited

U.S. PATENT DOCUMENTS

| | | | | | |
|---|---|---|---|---|---|
| 5,469,031 | A | * | 11/1995 | Chorey | 318/375 |
| 5,582,756 | A | * | 12/1996 | Koyama | 219/497 |
| 6,333,611 | B1 | * | 12/2001 | Shibuya et al. | 318/370 |
| 6,611,126 | B2 | * | 8/2003 | Mizuno | 318/801 |
| 6,752,614 | B2 | * | 6/2004 | Mizuno | 425/145 |
| 8,049,442 | B2 | * | 11/2011 | Lee | 318/139 |
| 2004/0149160 | A1 | | 8/2004 | Foesel et al. | |

FOREIGN PATENT DOCUMENTS

| | | |
|---|---|---|
| AT | 401116 | 6/1996 |
| DE | 10152198 | 9/1957 |
| DE | 10152487 | 2/2002 |
| DE | 102006036267 | 2/2008 |
| EP | 0603907 | 6/1994 |
| JP | 5193871 | 8/1993 |

* cited by examiner

*Primary Examiner* — Jill Heitbrink
(74) *Attorney, Agent, or Firm* — Lucas & Mercanti, LLP

(57) ABSTRACT

The polymer processing machine, is an injection molding machine, which has at least two electrical consumers (1, 2, 3, 4). At least one of the electrical consumers (1, 2, 3) is also designed as a generator for the conversion of kinetic energy into electrical energy. The machine is connected for its supply with electrical energy with an electrical alternating current network (5). To increase the energy efficiency of the machine, the electrical network (5) is connected to a direct current intermediate circuit (7) via a rectifier (6). At least a part of the electrical consumers (1, 2, 3, 4) are electrically connected to the direct current intermediate circuit (7) and are powered from the direct current intermediate circuit (7) with electrical energy. At least a part of the electrical consumers (1, 2, 3) which are designed as generator operation are electrically connected to the direct current intermediate circuit (7) for supplying it with generated electrical energy.

10 Claims, 2 Drawing Sheets

Figure 1:
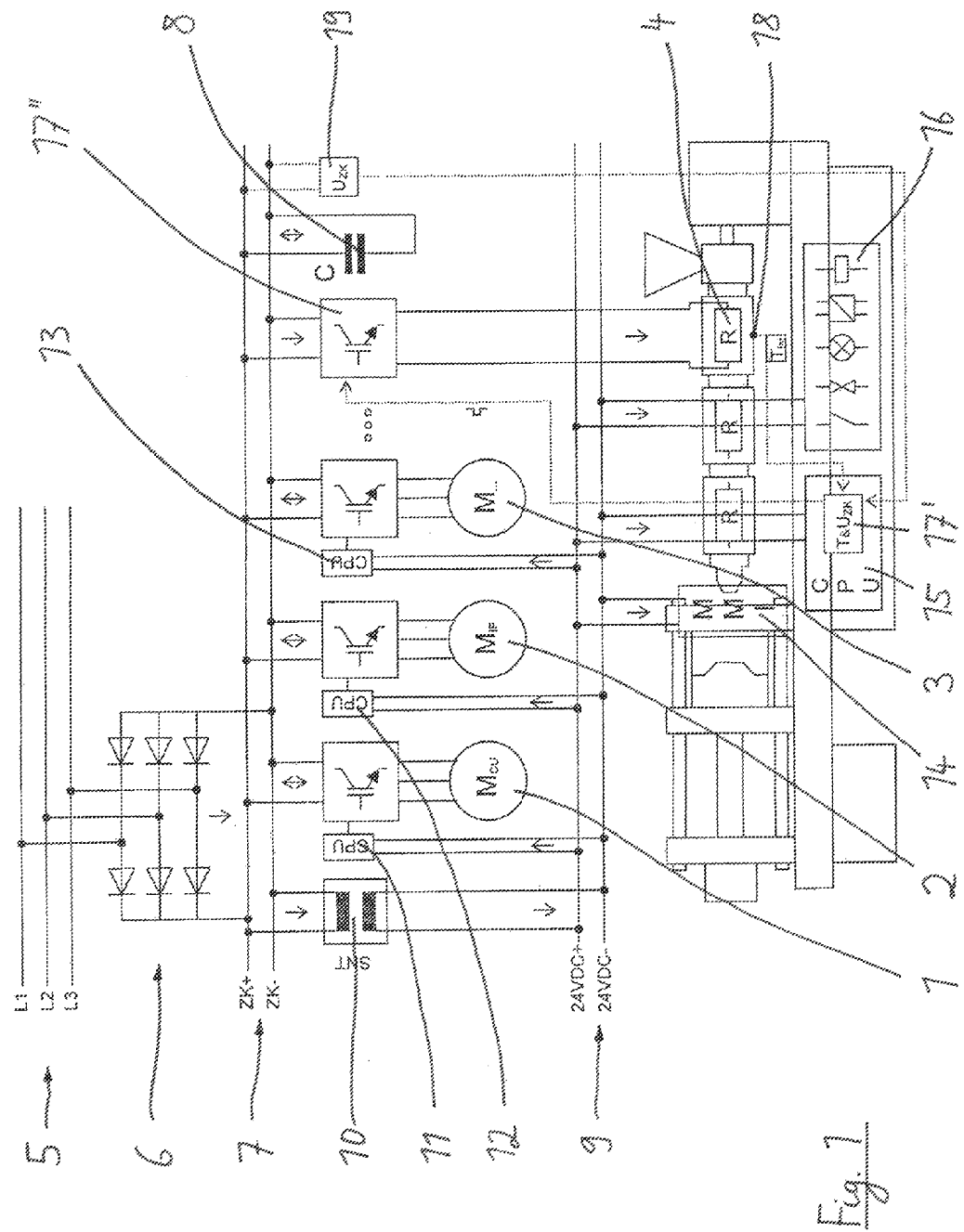

POLYMER PROCESSING MACHINE AND METHOD FOR THE OPERATION OF A POLYMER PROCESSING MACHINE

The invention relates to a polymer processing machine, especially to a injection moulding machine, which has at least two electrical consumers, wherein at least one of the electrical consumers is also designed for generator operation for the conversion of kinetic energy into electrical energy, wherein the machine is connected for its supply with electrical energy with an electrical alternating current network, wherein the electrical network is connected with a direct current intermediate circuit via a rectifier, wherein at least a part of the electrical consumers are electrically connected with the direct current intermediate circuit and are powered from the direct current intermediate circuit with electrical energy and wherein at least a part of the electrical consumers which are designed for generator operation are electrically connected with the direct current intermediate circuit for supplying it with generated electrical energy. Furthermore, the invention relates to a method for the operation of such a polymer processing machine, An injection moulding machine and a method of this kind are known from AT 401 116 B. A similar solution is disclosed in DE 10 2006 036 267 A1.

The energy efficiency of a polymer processing machine and especially of an injection moulding machine gains more and more in importance. Injection machines of the kind mentioned above are known in which the multiple actuations and drive movements are executed by means of electrical motors, especially servo motors. Mostly, such a solution already improves the energy efficiency compared with a hydraulically driven injection moulding machine. Even in the case of very economical electrically driven injection moulding machines it is looked for possibilities to further improve the energy efficiency.

An approach for doing so could be to recover and to use respectively the kinetic energy which accrues during deceleration or breaking applications, which energy is indeed usually transferred into electrical energy in electrically driven injection moulding machines but is then converted into heat in breaking and ballast resistances.

A concrete possibility to use this concept could be to employ servo converters which are able to feed-back energy into the network. But this has the following drawbacks: At the one hand significant higher costs occur for the components, which are partly very complex. Otherwise higher losses take place due to feed-back impedances and also due to network filters, what becomes relevant in both directions of energy flow, i. e. also in the case of abstraction of energy from the network. Furthermore, limitations concerning the deceleration must be feared in the case of power failure (in the extreme case it is not possible to break) because the voltages in the electrical net of the injection moulding machine would raise unallowable high.

Thus, it is the object of the invention to further develop a polymer processing machine, especially an injection moulding machine, in such a way and to propose a method for its operation that it becomes possible to further increase the energy efficiency of the machine.

The solution of this object by the invention is characterized in that at least one electrical consumer is electrically coupled to the direct current intermediate circuit, wherein the abstraction of energy by the electrical consumer from the direct current intermediate circuit is controlled by a semiconductor switch element, wherein the semiconductor switch element for controlling the energy consumption of the electrical consumer is designed in such a way that on the one hand the energy necessary for its operation is supplied to the consumer from the direct current intermediate circuit and on the other hand the intermediate circuit voltage in the direct current intermediate circuit is kept below a maximal allowable value.

Preferably, at least one storage element for electrical energy is electrically connected with the direct current intermediate circuit. This storage element is mostly a capacitor with high capacity.

A control circuit can be electrically connected with the direct current intermediate circuit via a switching power supply. At least one electrical consumer can be electrically connected with the control circuit. The electrical consumer is for example a machine control (CPU), a control unit (MMI), a control unit of a servo converter, a sensor, an alarm lamp, a contactor, a switch, a valve, a magnet and/or a fan.

At least one electrical consumer can be electrically coupled to the direct current intermediate circuit, wherein the abstraction of energy by the electrical consumer from the direct current intermediate circuit is controlled by a semiconductor switch element. This electrical consumer can be for example a heating element of the injection moulding machine. The semiconductor switch element is preferably an Insulated Gate Bipolar Transistor (IGBT).

The semiconductor switch element can be connected with at least one sensor for the detection of an operation parameter of the electrical consumer. Furthermore, it can be connected with at least one voltage meter for the detection of the voltage of the direct current intermediate circuit. The semiconductor switch element can thereby comprise a first comparator for the comparison of the value of the operation parameter which is detected by the sensor with a predetermined value of the operation parameter; in this case the semiconductor switch element can comprise a first processing unit for the determination of the necessary on-time for the electrical consumer for maintaining of the predetermined value of the operation parameter.

Furthermore, the semiconductor switch element can comprise a second comparator for the comparison of the value of the intermediate circuit voltage which is detected by the voltage meter with a predetermined maximal value of the intermediate circuit voltage; it can then comprise a second processing unit for the determination of the necessary on-time for the electrical consumer for maintaining of the maximal value of the intermediate circuit voltage.

The first and the second processing unit can be connected with a generator of maximum value which determines the bigger one of the two values for the on-time. The generator of maximum value can be connected in this case with the semiconductor switch element for pretending of a predetermined on-time for the electrical consumer. A functional block can be arranged between the generator of maximum value and the semiconductor switch element for the definition of switching-on pulses.

The method for the operation of a polymer processing machine, especially of an injection moulding machine, which has at least two electrical consumers, wherein at least one of the electrical consumers is also designed for generator operation for the conversion of kinetic energy into electrical energy, wherein the machine is connected for its supply with electrical energy with an electrical alternating current network, wherein electrical energy is supplied from the network in a direct current intermediate circuit via a rectifier, wherein at least a part of the electrical consumers are electrically connected with the direct current intermediate circuit and are powered from the direct current intermediate circuit with electrical energy and wherein at least a part of the electrical consumers which are designed for generator operation supply electrical energy gained from kinetic energy into the direct current intermediate circuit is characterized by the invention in that at least one of the electrical consumer is controlled by means of a semiconductor switch element in such a way that on the one hand the energy necessary for its operation is supplied to the consumer from the direct current intermediate circuit and on the other hand the intermediate circuit voltage in the direct current intermediate circuit is kept below a maximal allowable value.

During the operation of the machine electrical energy can be stored in a storage element for electrical energy, especially in a capacitor, which is connected electrically with the direct current intermediate circuit.

A preferred embodiment of the method proposes that no electrical energy is taken from the network as long as the voltage in the direct current intermediate circuit is above a predetermined value. This predetermined value is especially the voltage in the rectifier.

A further advantageous embodiment of the method proposes that suitable electrical consumer being servo motors are used for the generator operation, wherein those servo motors comprise a servo converter with a breaking transistor, especially in the form of a semi conductor element or of an Insulated Gate Bipolar Transistor (IGBT), wherein the breaking transistor is used for the activation of a further electrical consumer.

The proposed system for the recovering of kinetic energy especially for electrical injection moulding machines is a concept which consists of several single measures to recover and reasonably use the kinetic energy which accrues during deceleration and breaking applications of electrically driven axes. Furthermore, the above mentioned drawbacks of systems which feed-back energy into the network are eliminated advantageously. Furthermore, even costs can be reduced additionally.

Furthermore, with the proposed embodiment it becomes possible that the electrical power input of the injection moulding machine can be reduced. By this costs can be reduced which would be necessary otherwise for the electrical power supply, for the main switch, for the wire cross section etc.

Furthermore, the invention proposal offers benefits during power failure. The supply of the switching power supply for the control circuit from the direct current intermediate circuit which is a part of the proposed concept makes it possible to bring all axes of the injection moulding machine to a halt in a controlled manner in the case of a power failure because the control circuit for the drives, for the machine control and for the whole electrical equipment of the machine can be maintained till shutdown. A damage of the machine due to power failure can thus be avoided (especially a collision with mechanical stop positions during run out).

In the drawing an embodiment of the invention is shown.

Figure 2:
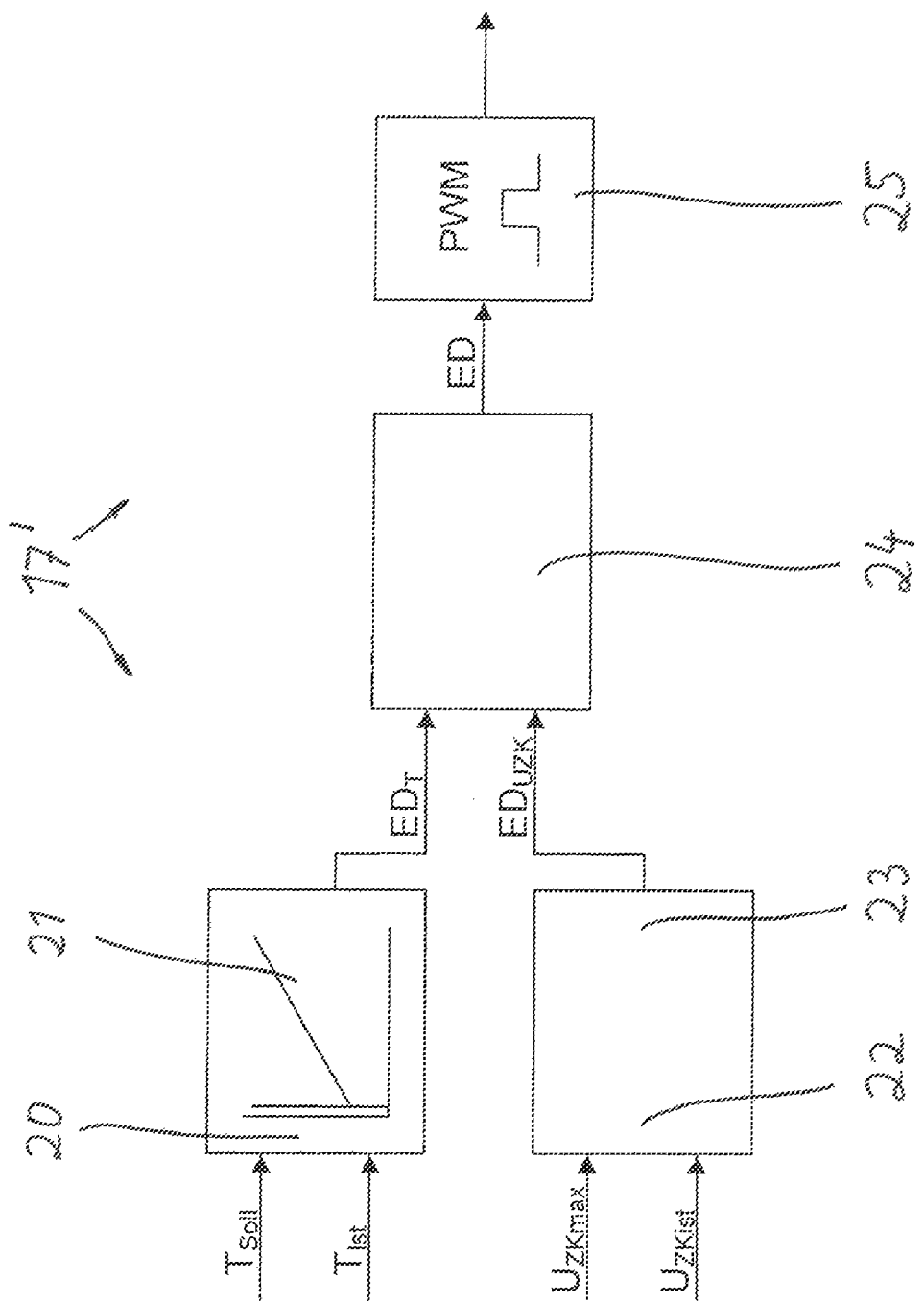

FIG. 1 shows schematically the electrical wiring diagram of an injection moulding machine and FIG. 2 shows in detail an electronic semiconductor switch element.

In FIG. 1 an electrical wiring diagram is depicted which belongs to an injection moulding machine which is designed as so-called electrical injection moulding machine. Accordingly, all drives of the machine are electrical ones, preferably servo motors. The injection moulding machine has several electrical consumers 1, 2, 3, 4. The consumers 1, 2 and 3 are servo motors for driving of actuation elements. The motor 1 serves for driving the closure unit of the injection moulding machine. The motor 2 serves for driving the injection unit. The motor 3 serves presently for driving of a further axis, which can be e. g. that one of an ejector. The motors 1, 2, 3 are also suitable to be operated generatorically, i. e. to gain electrical energy from kinetic energy.

The consumer 4 is a heating element which is required e. g. to heat up plastic material in the plasticating cylinder. The consumer 4 is suitable for high voltages, especially for voltages of 900 VDC or more. Furthermore, the consumer 4 is suitable for absorbing high power peaks which however last only for a short time, especially of at least 30 kW during a period of at least 250 ms.

The injection moulding machine is supplied with energy by an alternating current network 5 which is three-phased—as depicted. The three phases of alternating current are converted into direct current by means of a rectifier 6 and fed into a direct current intermediate circuit 7. The electrical consumers 1, 2, 3, 4 are all electrically connected with the direct current intermediate circuit 7.

The rectifier 6 thus supplies the common direct current intermediate circuit 7 from the alternating current network 5, wherein all drives and other consumers respectively are supplied from the direct current intermediate circuit 7. Via this direct current intermediate circuit network an exchange of energy can already take place, when e. g. a drive is decelerated (braked), hereby works generatorically and supplies energy into the direct current intermediate circuit 7, which energy can be abstracted by another consumer, e. g. for the acceleration of another axis of the machine by means of another consumer.

The direct current intermediate circuit 7 is electrically connected with an electrical storage element 8 (energy storage) being a capacitor with high capacity. During breaking applications the capacitor 8 is loaded whereby the intermediate circuit voltage $U_{ZK}$ rises. As long as the voltage of the capacitor 8 is above the value of the rectifier (i. e. above the rectifier voltage) no energy is taken from the alternating current network 5, but the whole system is supplied electrically from the capacitor.

A control circuit 9 which is necessary for the operation of the injection moulding machine is supplied via a switching power supply 10 for the production of the control voltage (e. g. 24 VDC) from the direct current intermediate circuit 7 with electrical energy and that exclusively from the direct current intermediate circuit. Hereby energy is taken from the direct current intermediate circuit 7 permanently, thus also in periods in which exclusively breaking applications of drives occur. The control circuit 9 supplies a plurality of electrical consumers, like e. g. machine controllers 11, 12, 13 (CPU; controlling units), a control unit 14 (MMI; screen, input unit), a control unit of a servo converter 15 (CPU), sensors, alarm lamps, contactors, switches, valves, magnets etc. which are denoted with reference numeral 16. Those electrical consumers 11, 12, 13, 14, 15, 16 form a not negligible part of the whole energy consumption (e. g. 500 W).

A consumer—shown as an example in the embodiment for a consumer 4 being a heating band of a zone of the heating system of the plasticating cylinder—can be switched to the direct current intermediate circuit 7 by means of a semiconductor switch element 17', 17". The semiconductor switch element 17' can be arranged within the machine control unit. In the embodiment the semiconductor switch element is an Insulated-Gate Bipolar Transistor (IGBT). This is a semiconductor element used in the power electronics because it combines the benefits of the bipolar transistor (good passage behavior, high block voltage, robustness) with the benefits of a field-effect transistor (almost powerless activation). Also beneficial is a certain robustness against short-circuits because the IGBT limits the load current.

Thereby, the consumer 4 is designed in such a way that it is suitable for the high or highest admissible voltage of the direct current intermediate circuit (e. g. 900 VDC), that it can absorb high power peaks (e. g. 30 kW) for short time periods (e. g. for 250 ms) and in doing so that it can fulfill its actual purpose with respect to the nominal power (here: heating of a zone of the plasticating cylinder).

So, the consumer 4 has two tasks: On the one hand it is available for the reduction of energy in the direct current intermediate circuit in the case if in breaking phases all other elements (drives 1, 2, 3, storage element 8, control circuit 9) do not extract enough energy from the direct current intermediate circuit 7 and so not to allow the intermediate circuit voltage to rise above the maximal allowable value. On the other hand the consumer has of course its original task, presently the heating of a zone of the plasticating unit.

In the embodiment the semiconductor switch element 17', 17" consists of two parts (17' and 17"). The part 17' is shown in FIG. 2 with the essential elements in detail. This part of the semiconductor switch element detects by means of a sensor 18 presently the temperature T of the heating element 4, i. e. the actual value $T_{ist}$. Furthermore, the actual intermediate circuit voltage $U_{ZKist}$ is measured by means of a voltage meter 19 and is fed to the semiconductor switch element 17'. From storage means, which are not further depicted, the reference temperature $T_{Soll}$ of the heating element 4 and the maximal allowable intermediate circuit voltage $U_{ZKmax}$ are then fed to the semiconductor switch element 17' (see FIG. 2).

In a first comparator 20 the temperature difference between the reference temperature and the actual temperature is determined and in a following first processing unit 21 it is calculated how long an on-time $ED_T$ of the heating element 4 must be to reach the reference temperature.

Furthermore, in a second comparator 22 the difference between the measured intermediate circuit voltage $U_{ZKist}$ and the maximal allowable intermediate circuit voltage $U_{ZKmax}$ is determined and in a following second processing unit 23 it is calculated how long an on-time $ED_{UZK}$ for the consumer 4 would have to be to not exceed the maximal allowable voltage value.

Both values of the on-time $ED_T$ (for the control zone of the cylinder temperature) and $ED_{UZK}$ (for the limitation of the voltage of the intermediate circuit) are now transferred to a generator of maximum value 24. In this functional unit the respective bigger one of the on-time ED is determined and further transferred to a functional block 25.

Thus, the on-time $ED_{UZK}$ is embraced and taken into account respectively by $ED_T$. The resulting on-time ED is transformed in the functional block into a controlling signal (modulation of pulse width PWM) and is transferred to the second part 17" of the semiconductor switch element where the power drain from the direct current intermediate circuit 7 by the consumer 4 is controlled respectively, i. e. taking into account the respective parameter of the consumer 4 the turn-on pulses for the semiconductor switch element 17" are issued and the consumer 4 is controlled with them.

The semiconductor switch element 17', 17" thus serves on the one hand for the limitation of the direct current intermediate circuit voltage and for the reduction of energy in the direct current intermediate circuit respectively and on the other hand simultaneously for the controlling of an operation parameter, e. g. for the temperature controlling of a heating element in the plasticating cylinder.

A possibility to further reduce costs is given if the breaking transistor (semiconductor element and IGBT respectively) for the control of a consumer (e. g. a zone of the heating of the plasticating cylinder) is used which is existing serially in a lot of servo converters. Thereby the Solid State Relay can be omitted which is usually employed for this purpose.

In FIG. 1 arrows show the direction in which energy is flowing. The alternating current network 5 has a voltage which is typically 400 VAC. In the direct current intermediate circuit 7 a voltage of about 560 VDC for example is aimed for. The control circuit 9 is mostly operated with 24 VDC.

LIST OF REFERENCE NUMERALS 1 electrical consumer (motor)
2 electrical consumer (motor)
3 electrical consumer (motor)
4 electrical consumer (heating element)
5 alternating current network
6 rectifier
7 direct current intermediate circuit
8 storage element (capacitor)
9 control circuit
10 switching power supply
11 electrical consumer (CPU)
12 electrical consumer (CPU)
13 electrical consumer (CPU)
14 electrical consumer (control unit MMI)
15 electrical consumer
16 electrical consumer
17', 17" semiconductor switch element (IGBT)
18 sensor
19 voltage meter
20 first comparator
21 first processing unit
22 second comparator
23 second processing unit
24 generator of maximum value
25 functional block (for modulation of pulse width PWM)

The invention claimed is:

1. A polymer processing machine, comprising:
a rectifier electrically connectable to an electrical alternating current network for supplying electrical energy to the machine;
a direct current intermediate circuit electrically connected to the rectifier and receiving electrical energy from the rectifier;
electrical consumers electrically connected to the direct current intermediate circuit and receiving power from the direct current intermediate circuit;
at least a first one of the electrical consumers converts kinetic energy into electrical energy, generating electrical energy, and supplying the generated electrical energy to the direct current intermediate circuit;
at least a second one of the electrical consumers is a heating element for heating the polymer;
a semiconductor switch, electrically connected to the direct circuit intermediate circuitry and electrically connected to the heating element;
at least one voltage meter electrically connected to the direct current intermediate circuit, electrically connected to the semiconductor switch, and detecting the voltage of the direct current intermediate circuit;
at least one temperature sensor electrically connected to the semiconductor switch and detecting an operational parameter of the heating element;
a first comparator in the semiconductor switch for comparison of the detected, operational parameters detected by the temperature sensor with a predetermined value of the operational parameter;

a first processing unit in the semiconductor switch for determining an on time for the heating element for maintaining the predetermined value of the operational parameter;

a second comparator in the semiconductor switch for comparing the detected voltage detected by the voltage meter with a predetermined maximal value of the voltage of the direct current intermediate circuit;

a second processing unit in the semiconductor switch for determining an on time for the heating element for maintaining the maximal value of the voltage of the direct current intermediate circuit; and the semiconductor switch controlling the energy consumption of the heating element such that the heating element receives electrical energy from the direct current intermediate circuit for operation and the voltage of the direct current intermediate circuit is kept below the maximal value, of the voltage of the direct current intermediate circuit.

2. Polymer processing machine according to claim 1, wherein at least one storage element for electrical energy is electrically connected with the direct current intermediate circuit.

3. Polymer processing machine according to claim 2, wherein the storage element, for electrical energy as a capacitor.

4. Polymer processing machine according to claim 1 wherein a control circuit is electrically connected with the direct current intermediate circuit via a switching power supply.

5. Polymer processing machine according to claim 4, wherein at least a third of the electrical consumers is electrically connected with the control circuit.

6. Polymer processing machine according to claim 5, wherein the at least a third one of the electrical consume is a machine control, a control unit, a control unit of a servo converter, a sensor, an alarm lamp, a contactor, a switch, a valve, a magnet and/or a fan.

7. Polymer processing machine according to claim 1, wherein the semiconductor switch element is an Insulated Gate Bipolar Transistor.

8. Polymer processing machine according to claim 1, wherein the first and second processing unit are connected with a generator of maximum value which determines the bigger one of the two values for the on-time.

9. Polymer processing machine according to claim 8, wherein the generator of maximum value is connected with the semiconductor switch element for pretending of a predetermined on-time for the electrical consumer.

10. Polymer processing machine according to claim 9, wherein a functional block is arranged, between the generator maximum value and the semiconductor switch element for the definition of switching-on pulses.

\* \* \* \* \*